Patented Sept. 15, 1953

2,652,372

UNITED STATES PATENT OFFICE 2,652,372

CATALYTIC HYDROGENATION OF CARBON MONOXIDE TO ORIENTABLE, ESSENTIALLY HYDROCARBON POLYMERS

Mark W. Farlow, Wilmington, Del., and Elbert C. Herrick, Boothwyn, Pa., assignors to E. I. du Pont de Nemours & Company, Wilmington, Del., a corporation of Delaware No Drawing. Application July 10, 1951, Serial No. 236,086

12 Claims. (Cl. 260—2)

This invention relates to polymers which are essentially hydrocarbon in nature and to methods for their preparation. More particularly, this invention relates to new high molecular weight essentially hydrocarbon polymers which are orientable by cold drawing and to novel catalytic methods for their preparation.

This application is a continuation-in-part of our application Serial No. 186,112, filed September 21, 1950 which latter application is a continuation of our application Serial No. 143,366, filed February 9, 1950, both now abandoned.

It is well known that in the presence of specific catalysts, and under certain conditions of temperature and pressure, carbon monoxide and hydrogen react to give methanol and branched chain higher alcohols (U. S. Patent 1,770,165). It is also well known that under certain other conditions involving the use of certain cobalt-containing or ruthenium-containing catalysts the reaction between carbon monoxide and hydrogen leads to the formation of paraffin waxes (Fischer et al., Brennstoff-Chemie 19, 226–30 (1938); ibid. 20, 247–50 (1939); cf. also British Patent 468,434).

High molecular weight straight chain alcohols and other oxygen-containing organic compounds have also been obtained by hydrogenation of carbon monoxide in the presence of metals of the eighth group suspended in paraffin hydrocarbons ("Patent Applications in the Field of Fischer-Tropsch and Allied Reactions," vol. II, 1948, translated by Charles A. Meyer & Co., containing the following German patent applications of the I. G.: R–106,854 IVD/12o, January, 1940; O. Z. 14,718 J/Z, April 25, 1944; O. Z. 14,225, January 8, 1943; O. Z. 14,226, June 8, 1943; O. Z. 12,880, July 5, 1941). In general, the waxes previously obtained were produced simultaneously with compounds of relatively low molecular weight (Fischer and Pichler, Brennstoff-Chemie 20, 247–50 (1939)), the average molecular weight of the products being generally less than 1000. These previously known waxy reaction products contained ingredients which could be distilled at high temperatures and low pressures (200° C./2 mm.).

It is an object of this invention to provide new polymers which are essentially hydrocarbon in nature and novel catalytic methods for their preparation. A further object is to provide high molecular weight essentially hydrocarbon polymers which are orientable by cold drawing and which have relatively high inherent viscosities. A still further object is to obtain from carbon monoxide and hydrogen essentially hydrocarbon polymers which form films having high stiffness moduli and high breaking strengths. Another object is to provide fiber-forming hydrocarbon polymers from carbon monoxide and hydrogen. Still another object is to provide a novel catalytic method for producing high molecular weight hydrocarbon polymers which are orientable by cold drawing and have high breaking strengths. Other objects will appear hereinafter.

The objects of this invention are accomplished by providing a new catalytic process for the preparation of high molecular weight, essentially hydrocarbon, polymers which are orientable by cold drawing and which have inherent viscosities of at least 0.74. This invention also provides novel orientable, essentially hydrocarbon, polymers which melt above 130° C., have an inherent viscosity of at least 1.0, have stiffness moduli greater than 150,000 lbs./sq. in., and have microtensile breaking strengths, determined as described by W. M. D. Bryant in J. Pol. Sci., II, 547–64 (1947), of at least 100,000 lb./sq. in., based on the relaxed, drawn dimension of a film of the polymer. Included in the novel polymers of this invention are high molecular weight, essentially hydrocarbon, polymers having high inherent viscosities above 2.00 and melting above 140° C. Inherent viscosity $= (\ln n_r)/c$ wherein "ln" is the natural logarithm, "$n_r$" is the viscosity of the solution, relative to that of the solvent and "$c$" is the concentration expressed as g. solute/100 cc. solvent. The term inherent viscosity is defined by L. H. Cragg, J. of Colloid Science I, 261–269 (1946).

It has been discovered, in accordance with this invention, that in the production of high molecular weight, essentially hydrocarbon, polymers from carbon monoxide and hydrogen that formation of low molecular weight products is minimized by employing a molybdenum compound, of the kind to be more specifically defined hereinafter, as the catalyst.

The novel high molecular weight, essentially hydrocarbon, polymers of this invention are the products obtained by the catalytic hydrogenation of carbon monoxide, under pressure, in the presence of a catalyst containing molybdenum in chemical combination with oxygen and a metal whose ions are soluble in aqueous ammonia in excess of that stoichiometrically required to precipitate the metal ion, in which combination the oxygen:molybdenum atomic ratio is from 1.5:1 to 3:1. The ions of some metals form, by reaction with aqueous ammonia, oxides or hydroxides which are soluble in water as well as in excess aqueous ammonia. Such metals are included within the stated definition of metals whose ions are soluble in excess aqueous ammonia.

In producing the high molecular weight, essentially hydrocarbon, polymers of this invention, a pressure reactor is charged with a diluent and the catalyst, the reactor is swept with oxygen-free nitrogen, cooled to 0° C., and evacuated. The reactor is then pressured to a specific level with a carbon monoxide/hydrogen gas mixture of predetermined composition and the reaction mixture is heated to between 125° C. and 300° C. until there is no further pressure drop. Throughout the period of reaction, the pressure within the reactor is maintained at the selected level by repressuring with carbon monoxide/hydrogen gas mixture of the same or of different composition from that initially used. After reaction is complete, the reactor is permitted to cool, opened, and the contents discharged and filtered. The solid polymeric product is separated from the catalyst by extraction or by other means known to those skilled in the art.

A preferred method of producing the essentially hydrocarbon polymers of this invention is by employing a continuous catalytic converter in which the mixed carbon monoxide/hydrogen gas and the liquid reaction medium are injected into the top of the converter and passed downwardly through the catalytic zone and in contact with the catalyst therein. The products of the reaction are removed by gravity flow from the bottom of the converter to a hot separator from which gaseous products are led to a cold separator and condensed. This continuous, down-flow method of operation to produce the novel, essentially hydrocarbon, polymers of this invention is illustrated by Examples XIV, XV, and XVI.

The examples which follow are submitted to illustrate and not to limit this invention. Unless otherwise stated, parts are by weight.

*Example I*

A reaction mixture consisting of 97 parts of tetrahydronaphthalene, 15 parts of nickel molybdite, 5 parts of a mixed dodecyl acid phosphate, and a gas mixture composed of 2 moles of hydrogen per mole of carbon monoxide was heated at 175° C. and 900 to 1000 atmospheres pressure, which was maintained over a 14-hour period by repressuring with the same gas mixture. At the completion of the run, the vessel was cooled, vented, and its contents were discharged.

The polymer and catalyst were separated from the reaction medium by filtration and washed with acetone. The filtrate was diluted with methanol, and the precipitate which formed was separated by filtration and found to amount to 0.07 part. The polymer was separated from the catalyst by two successive extractions with boiling xylene and a final extraction with boiling tetrahydronaphthalene. The first xylene extract was diluted with methanol and the precipitated polymer separated by filtration, washed several times with methanol, and dried. The polymer from the first xylene extract amounted to 1.5 parts. From the second xylene extract, by a similar procedure, there was isolated 4.3 parts of essentially hydrocarbon polymer which was found to be orientable. The tetrahydronaphthalene extract, using a similar procedure, yielded 0.4 part of a polymer which was orientable. Of the total material obtained, 75% was orientable.

The orientable essentially hydrocarbon polymer was found to have the following physical properties: polarizing microscopic melting point, 134.7±0.5° C.; inherent viscosity, 1.1 measured at 0.1% concentration in tetrahydronaphthalene at 125° C.; amorphous content of a 20 mil film, annealed, 6.8%; shock cooled, 16.8%; density of the annealed film, 0.974; density of the shock cooled film, 0.952. The orientable essentially hydrocarbon polymer was found to have a stiffness modulus of 150,000 to 190,000 lbs./sq. in., measured on a film of 0.008 inch thickness. Microtensile measurements on a 1–2 mil film showed an elongation of 2400%. The breaking strength figured on the relaxed drawn dimensions of the film was 100,000 lbs./in.$^2$. The yield point was 3,000 lbs./sq. in. at an elongation of 10–30%.

Duplication of Example I using xylene as the reaction medium, instead of tetrahydronaphthalene, yielded a product which after compositing with that of other similar runs was found to contain 85.50, 85.28% carbon; 14.29, 14.29% hydrogen; and 0.19, 0.19% oxygen.

Infrared examination of a sample of an essentially hydrocarbon polymer similar to the above showed it to have a trace of carbonyl, bands for terminal and internal unsaturation at 10.1 microns and 11.0 microns and 10.4 microns and bands for branching at 11.2 microns. The infrared analysis also indicated that the material had 1.2 methyl groups per 100 carbon atoms.

*Example II*

Example I was repeated, except that the catalyst charge consisted of 13 parts of nickel molybdite which had been used in two previous runs and the reaction temperature was 200° C. The yield of essentially hydrocarbon polymer amounted to 1.47 parts, of which 1.35 parts, or 92% was insoluble in boiling benzene, had an inherent viscosity of 1.31, measured at 0.1% concentration in tetrahydronaphthalene at 125° C., and melted at 130° C. The benzene insoluble material was orientable. A melt pressed film which had been shock cooled in ice water had a tensile strength of 4,400 lb./sq. in. at 80% elongation. The film was tough and orientable.

*Example III*

A silver-lined pressure vessel was flushed with nitrogen, charged with 5 parts of nickel molybdite, 7.5 parts of 85% phosphoric acid, and 65 parts of xylene, again flushed with nitrogen, evacuated and cold pressured to 450 atm. with a mixture of hydrogen and carbon monoxide in the molar ratio of 1:1. The vessel was agitated and maintained at 225° C. for 15 hours, during which time the pressure was maintained at 900 to 1000 atmospheres by repressuring periodically with the same gas mixture. At the completion of the run, the vessel was cooled, vented, its contents discharged, and filtered. The solid product and catalyst were washed with water, and heated in xylene in order to dissolve the solid polymer. The catalyst was separated from the xylene solution of the solid polymer by filtration. After evaporation of the bulk of the xylene, methanol was added to precipitate the solid polymer, which was separated by filtration, washed several times with methanol, and dried. The yield of crude product amounted to 2.1 parts, formed fibers which could be cold drawn, melted at 125° C., and had an inherent viscosity at 0.1% concentration in tetrahydronaphthalene at 125° C. of 0.89.

Example IV

A reaction mixture comprising 87 parts of xylene, 10 parts of 85% phosphoric acid, and 15.4 parts of a nickel molybdite-cyclohexane paste containing 5 parts of nickel molybdite, and an initial gas mixture containing 3 moles of carbon monoxide per mole of hydrogen was heated at 225° C. and 900 to 1000 atmospheres pressure, which was maintained over a 15-hour period by repressuring periodically with a mixture of 2 moles of hydrogen per mole of carbon monoxide. By the procedure used in Example I there was obtained 1.3 parts of polymer melting at 129° C. The crude product formed fibers which could be cold drawn.

Example V

A reaction mixture comprising 5 parts of nickel moylbdite, 1 part of dodecyl acid phosphate, 17 parts of xylene, and a gas mixture of 2 moles of hydrogen per mole of carbon monoxide was heated at 175° C. and 2800 to 3000 atmospheres pressure for 3 hours. The reaction mixture was filtered to remove catalyst and polymer. The polymer was separated from the catalyst by extraction with boiling heptane, followed by extraction with boiling xylene. Addition of the xylene extract to methanol produced 0.6 part of fiber-forming polymer having a melting point of 128° C. and an inherent viscosity of 0.75 measured at 0.1% concentration in tetrahydronaphthalene at 125° C.

Example VI

A reaction mixture comprising 50 parts of distilled water, 1.75 parts of 85% phosphoric acid, 20 parts of nickel molybdite catalyst, and a mixture of hydrogen and carbon monoxide in the molar ratio of 2:1 was heated at 175° C. and 800 to 1000 atmospheres pressure, which was maintained over a 15-hour period by repressuring periodically with the same gas mixture. The reaction mixture was filtered to remove catalyst and polymer and the latter was dried. Extraction of the dry solid with boiling benzene and addition of the hot benzene extract to methanol produced 0.92 part of solid polymer. A further extraction in the same manner with boiling xylene produced 8.0 parts of solid polymer having a relative viscosity of 1.079 and an inherent viscosity of 0.76 measured at 0.1% concentration in tetrahydronaphthalene at 125° C.

Example VII

A silver-lined vertical continuous contact catalytic converter containing 53 parts of 8–14 mesh nickel molybdite, which had been treated at room temperature with a 5% aqueous solution of phosphoric acid, was filled with decahydronaphthalene and heated to 185° C. The pressure was raised to 800 atmospheres by injection of decahydronaphthalene. A stream of decahydronaphthalene and a stream of mixed gas composed of 1.6 moles of hydrogen per mole of carbon monoxide were injected separately into a mixing block and fed as a single stream upward through the converter at a total pressure of 800 atmospheres. The liquid was injected at a space velocity of 1.13 parts of liquid per part of catalyst per hour and the gas was injected at a space velocity of 0.21 part per part of catalyst per hour. The operating pressure was maintained at 800 atmospheres pressure by regulating the rate of gas bleed-off. The reaction product, obtained by bleed-off at 4-hour intervals, was filtered and dried. The yield of essentially hydrocarbon polymer amounted to 0.44 part per hour, of which 0.29 part was insoluble in boiling benzene, had an inherent viscosity of 0.90 measured at 0.1% concentration in tetrahydronaphthalene at 125° C. and a melting point of 132° C.

Example VIII

A reaction mixture comprising 87 parts of xylene, 5 parts of dodecyl acid phosphate, 5 parts of a chromium promoted nickel molybdite catalyst, prepared using a procedure similar to that described in Example XI for the preparation of a cadmium promoted catalyst, and a gas mixture of 2 moles of hydrogen per mole of carbon monoxide was heated at 225° C. and 900 to 1000 atmospheres pressure, which was maintained over a 15-hour period by repressuring periodically with the same gas mixture. By the procedure used in Example III there was obtained 2.45 parts of polymer. The polymer, without fractionation, had a microscopic melting point of 127° C. and an inherent viscosity of 0.75 measured at 0.1% concentration in tetrahydronaphthalene at 125° C.

Example IX

A reaction mixture comprising 50 parts of distilled water, 5 parts of 85% phosphoric acid, 5 parts of nickel molybdite, and a mixture of hydrogen and carbon monoxide in the molar ratio of 1:1 was heated at 200° C. and 900 to 1000 atmospheres pressure, which was maintained over a 15-hour period by repressuring periodically with the same gas mixture. By the procedure described in Example III, there was obtained 2.5 parts of fiber-forming polymer, M. P. 128° C., which had an inherent viscosity at 0.1% concentration in tetrahydronaphthalene at 125° C. of 0.85.

Example X

A silver-lined pressure vessel was charged with 5 parts of nickel molybdite, 87 parts of xylene, 5 parts of mixed dodecyl acid phosphates, and a gas mixture of 2 moles of hydrogen per mole of carbon monoxide, and the mixture heated at 225° C. and 450 to 550 atmospheres for 15 hours, during which time the pressure was maintained at 450 to 550 atmospheres by repressuring periodically with the same gas mixture. By the procedure used in Example III, there was obtained 0.9 part of solid polymer, M. P. 128° C., which formed fibers which could be cold drawn, and which had an inherent viscosity at 0.1% concentration in tetrahydronaphthalene at 125° C. of 0.74.

The nickel molybdite catalyst used in the above examples was prepared as follows:

Seventeen hundred sixty-six parts of ammonium paramolybdate [$(NH_4)_6Mo_7O_{24}.4H_2O$], equivalent to 10 moles of $MoO_3$, was dissolved in 5000 parts of distilled water and neutralized by the addition of 810 parts of 28% aqueous ammonia. The resulting solution of ammonium molybdate [$(NH_4)_2MoO_4$] containing 1.9 moles excess ammonia was then added with stirring, at room temperature, to a solution of nickel nitrate, prepared by dissolving 2908 parts of nickel nitrate hexahydrate [$Ni(NO_3)_2.6H_2O$], equivalent to 10 moles of nickel salt, in 5000 parts of distilled water. A pale green precipitate was formed in an acid slurry having a pH of approximately 4.0 by alkaline-acid paper. The pH of the slurry was adjusted to 7.0 (Beckmann pH meter) by the addition of 450 parts of 28% aqueous ammonia. The precipitate was then washed, filtered, dried, and calcined at 400° C. for 18 hours. The calcined product, by analysis, was found to contain 23.2% nickel and 46.4% molybdenum.

The calcined product, prepared as described above, was reduced in hydrogen at gradually increasing temperatures up to 550° C. for a total of 25 hours of which period 18 hours was at 550° C. The reduced product was highly pyrophoric and glowed on exposure to air. Analysis of the reduced material showed it to contain 26.66% nickel and 53.1% molybdenum corresponding to $NiMoO_2/0.2MoO_3$.

Example XI

A reaction mixture comprising 87 parts of xylene, 5 parts of 85% phosphoric acid, 5 parts of a cadmium promoted nickel molybdite catalyst containing 90 mole per cent of nickel molybdite and 10 mole per cent of cadmium molybdite, prepared as described below, and a gas mixture of 2 moles of hydrogen per mole of carbon monoxide was heated at 225° C. and 900 to 1000 atmospheres pressure, which was maintained over a 15-hour period by repressuring periodically with the same gas mixture. By the procedure used in Example III, there was obtained 1.5 parts of solid polymer, M. P. 125° C., which formed fibers which could be cold drawn.

The cadmium modified nickel molybdite catalyst, used in the above example, was prepared as follows:

Eight hundred eighty-three parts of ammonium paramolybdate $[(NH_4)_6Mo_7O_{24}.4H_2O]$, equivalent to 5 moles of $MoO_3$ was dissolved in 2500 parts of distilled water and neutralized by the addition of 405 parts of 28% aqueous ammonia. The resulting solution of ammonium molybdate $[(NH_4)_2MoO_4]$, containing 0.95 mole excess ammonia, was then added with stirring at room temperature to a solution prepared by dissolving 1310 parts of nickel nitrate hexahydrate $$[Ni(NO_3)_2.6H_2O]$$

equivalent to 4.5 moles of nickel, and 155 parts of cadmium nitrate tetrahydrate $$[Cd(NO_3)_2.4H_2O]$$

equivalent to 0.5 mole of cadmium, in 2500 parts of water. A pale blue-green precipitate was formed in an acid slurry having a pH of approximately 6.4 by alkaline-acid paper. The pH of the slurry was adjusted to 7.0 (Beckmann pH meter) by the addition of 189 parts of 28% aqueous ammonia. The precipitate was then washed, filtered, dried and calcined at 400° C. for 24 hours. The calcined product by analysis was found to contain 20.15% nickel, 5.94% cadmium, and 42.8% molybdenum.

The calcined product prepared as described above was reduced in a 3:1 mixture of nitrogen and hydrogen at gradually increasing temperatures up to 450° C. for a total of 28 hours of which period 23.5 hours was at 450° C. During reduction at 450° C. cadmium metal was formed and volatilized out of the reduction zone and deposited as a metallic mirror in the cold exit end of the reduction tube. The reduced catalyst was then cooled to room temperature in nitrogen, discharged and sealed under nitrogen. The reduced product was pyrophoric and glowed on exposure to air. Analysis of the reduced material showed it to contain 25.4% nickel, 3.6% cadmium, and 53.3% molybdenum.

Example XII

A reaction mixture comprising 79 parts of methanol, 5 parts of cobalt molybdite, and a gas mixture of 2 moles of hydrogen per mole of carbon monoxide was heated at 200° C. and 700 to 1000 atmospheres pressure, which was maintained over a 15-hour period of repressuring with the same gas mixture. By the procedure described in Example III, there was obtained 2.7 parts of methanol insoluble product.

Example XIII

A reaction mixture consisting of 78 parts of cyclohexane, 1.75 parts of 85% phosphoric acid, and 20 parts of a nickel-molybdenum catalyst prepared as described below, and a gas mixture consisting of 2 moles of hydrogen per mole of carbon monoxide was heated at 175° C. and 900 to 1000 atmospheres pressure, which pressure conditions were maintained for 16 hours by periodically repressuring with the same gas mixture. At the completion of the run the reactor was allowed to cool, vented, and the contents discharged. The polymer and catalyst were separated from the reaction medium by filtration, and the polymer and catalyst washed with methanol. The polymer was separated from the catalyst by extraction, first with boiling benzene and then with boiling xylene. Addition of the benzene extract to methanol produced 1.14 parts of solid polymethylene. A similar precipitation of the xylene extract produced 5.09 parts of solid polymer which was orientable.

The catalyst used in the above experiment was prepared as follows:

A solution of ammonium paramolybdate $[(NH_4)_6Mo_7O_{24}.4H_2O]$, known commercially as ammonium molybdate, was prepared by dissolving 441.5 grams (2.5 moles of molybdenum) in 1250 ml. of $H_2O$ at 45–50° C. This solution was then added with stirring at 45–50° C. to a solution containing an equivalent amount of nickel nitrate prepared by dissolving 727 grams (2.5 moles nickel) of $Ni(NO_3)_2.6H_2O$ in 1250 ml. of $H_2O$ at 45–50° C.

The acid formed during precipitation was neutralized by the addition of 250 ml. of 28% aqueous ammonia. The precipitate so formed was filtered, washed, and dried at 120–130° C., converted by pelleting into 8/14 mesh granules and reduced in hydrogen.

The reduction was carried out in hydrogen at a space velocity of 250, at a temperature of 450° C. for a period of 3.75 hours after which reduction was apparently complete as indicated by the cessation of water formation.

During the reduction process the catalyst changed from light green to black accompanied by evolution of water reduction. It was then cooled to room temperature in hydrogen, flushed with nitrogen and discharged under nitrogen and sealed in a nitrogen atmosphere.

Examination of the reduced catalyst indicated that it was slightly pyrophoric when exposed to air at room temperature.

Analysis of the reduced product showed the following:

| Percent | | Ratio, Mo/Ni | Area, M²/g. |
|---|---|---|---|
| Ni | Mo | | |
| 23.13 | 55.28 | 1.46 | 96.1 |

Example XIV

The continuous catalytic converter used in Example VII was modified to permit injection of the mixed gas and the liquid reaction medium at the top of the converter. The products of the reaction were removed by gravity flow from the bottom of the converter to a hot separator from which gaseous products were led to a cold separator and condensed. The converter was charged with 79.5 parts of 8-14 mesh catalyst, prepared as described subsequently, mixed with 135 parts of copper pellets, having approximately the particle size of the catalyst. The converter was pressured with mixed gas composed of 1.6 moles of hydrogen per mole of carbon monoxide and heated to 185° C. The pressure inside the converter was adjusted to the operating level of 800 atm. A stream of decahydronaphthalene and a stream of mixed gas were injected separately into a mixing block and fed into the top of the converter at a total pressure of 800 atm. The mixed gas was injected at a space velocity of 0.34 part per part of catalyst per hour and the decahydronaphthalene was injected at a space velocity of 0.66 part per part of catalyst per hour. The operating pressure was maintained at 800 atm. by regulating the rate of gas bleed-off. The reaction product, obtained by bleed-off at four hour intervals from the separators, was filtered, washed with acetone, and dried. The yield of essentially hydrocarbon polymer amounted to 0.56 part per hour. The polymer had an inherent viscosity of 1.14 measured at 0.1% concentration in tetrahydronaphthalene at 125° C. and had a microscopic melting point of 130.6° C.

The catalyst used in the above experiment was prepared as follows:

A mixture of 435 parts of nickel nitrate hexahydrate, $Ni(NO_3)_2 \cdot 6H_2O$, and 264 parts of ammonium heptamolybdate, $(NH_4)_6Mo_7O_{24} \cdot 4H_2O$, was heated for two hours at 280° C., then for an additional two hours at 500° C. The resulting solid, 353 parts, was pressed and sized into 8-14 mesh granules, after which it was reduced for 18 hours at 400° C. in a current of hydrogen at a rate of 1000 volumes of hydrogen per hour per volume (apparent) of catalyst. The reduced catalyst was found to contain 29.5% of nickel, 49.1% of molybdenum, and 21.4% of oxygen (by difference). Immediately before use the reduced catalyst was covered, in an atmosphere of nitrogen, with 5% aqueous phosphoric acid and allowed to stand for 45 minutes. The treatment was repeated with a fresh portion of acid, after which the catalyst was washed thoroughly with water and charged into the reactor.

Example XV

Example XIV was repeated using 38.5 parts of a catalyst prepared as described subsequently, and toluene as the reaction medium. The mixed gas was injected at a space velocity of 0.35 part per part of catalyst per hour and toluene was injected in a space velocity of 2.44 parts per part of catalyst per hour. The yield of essentially hydrocarbon polymer amounted to 0.43 part per hour. The polymer had an inherent viscosity of 0.80 measured in 0.1% concentration in tetrahydronaphthalene at 125° C. and a microscopic melting point of 128.4° C.

The catalyst used in the above experiment was prepared as follows:

To a mixture of 185 parts of sodium bicarbonate in 500 parts of water was added gradually, with stirring, a solution of 291 parts of nickel nitrate hexahydrate in 500 parts of water. The precipitated nickel carbonate was removed by centrifuging, and was thoroughly washed with water. The wet solid was mixed with 26.5 parts of ammonium heptamolybdate tetrahydrate and dried at 125° C., giving 117 parts of product which was formed into 8-14 mesh pellets. Reduction of the latter was carried out for one hour at 450° C. in a stream of 1000 volumes of hydrogen per hour per volume (apparent) of unreduced catalyst. The reduced catalyst contained 73.1% of nickel, 19.3% of molybdenum, and 7.6% of oxygen (by difference). Immediately before use the reduced catalyst was extracted at room temperature in an atmosphere of nitrogen with 5% phosphoric acid for two hours, then washed thoroughly with water, and charged into the reaction vessel.

Example XVI

Example XIV was repeated except that the converter was charged with 89 parts of nickel molybdite catalyst, which had been treated at room temperature with a 5% aqueous solution of phosphoric acid. Mixed gas composed of 1.6 moles of hydrogen per mole of carbon monoxide was injected at a space velocity of 0.12 part per part of catalyst per hour and toluene was injected at a space velocity of 1.46 parts per part of catalyst per hour. The yield of essentially hydrocarbon polymer amounted to 0.35 part per hour. The product, as obtained from the separators, was composed of strings of very high molecular weight polymer and slurry of finely divided polymer. The strings of polymer which amounted to 25% of the total weight of polymer, had an inherent viscosity of 2.05, measured at 0.1% concentration in tetrahydronaphthalene at 125° C., and a microscopic melting point of 141° C. The finely divided polymer had an inherent viscosity of 0.81 measured at 0.1% concentration in tetrahydronaphthalene at 125° C. and had a microscopic melting point of 126° C.

The examples have illustrated certain conditions of temperature, pressure, catalyst concentration, carbon monoxide/hydrogen mixed gas composition, etc. It is to be understood that these are interdependent variables and that variation in one requires compensating adjustments in the others.

The process by which the essentially hydrocarbon polymers of this invention are obtained can be operated as a batch, or as a semi-continuous or continuous up-flow, down-flow, or countercurrent operation.

Whether for batch, semi-continuous, or continuous operation, up-flow, down-flow, or countercurrent operation, the desired mixtures of carbon monoxide and hydrogen are readily made upon the basis of pressures, calculated by successive substitutions into the following equation:

$$P_{(\text{initial CO})} = \frac{(C_{\text{initial CO}})(P_{\text{final}})}{(C_{\text{final CO}}) + N(C_{\text{final H}_2})}$$

where P stands for pressure, C stands for the compressibility of the carbon monoxide and of the hydrogen at the indicated pressure, and N is the desired carbon monoxide/hydrogen mole ratio in the mixture.

The mole ratio of carbon monoxide to hydrogen in the gas mixture may vary from 10:1 to 1:5. Usually, mole ratios of from 3:1 to 1:2 are used because gas mixtures in this range of compositions give optimum results from the standpoint of yield of desired high molecular weight hydrocarbons.

The temperature at which the hydrogenation of the carbon monoxide is effected lies in the range of 125 to 300° C. Because good reaction rates with best yields of desired high molecular weight hydrocarbons are obtained in the range 150° to 250° C., this range embraces the preferred operating temperature conditions.

The process is generally operated under a total pressure of at least 200 atmospheres. Because better yields of desired high molecular weight products, with maximum utilization of the carbon monoxide and hydrogen, are achieved using pressures in excess of 500 atmospheres, the use of such pressures is economical and embraces a preferred aspect of operation. The upper limit of pressure is not critical and the maximum is determined by the mechanical restrictions of the equipment used. Since the use of pressures in excess of 5000 atmospheres does not lead to any compensating advantages from the standpoint of yield of desired high molecular weight, essentially hydrocarbon polymer or economy of operation, it represents the practical upper limit of pressure.

Because the reaction is highly exothermic, it is preferred to operate in the presence of a reaction medium, which in addition to aiding in the dissipation of the heat of reaction also functions to bring about better catalyst contact and hence improve the efficiency of the process. Suitable media are water and organic solvents such as cyclohexane, methanol, decahydronaphthalene, tetrahydronaphthalene, benzene, toluene, xylene, cyclohexanone, methyl isobutyl ketone, etc. When the hydrogenation is carried out in an aqueous medium, it is advantageous, from the standpoint of molecular weight of essentially hydrocarbon material obtained, to operate in the presence of an acid and mineral acids, such as phosphoric acid, are especially useful in this connection. When the hydrogenation is carried out in the presence of organic media, such as toluene and xylene, best results are obtained in the presence of added acids, or alkyl acid phosphates, such as didodecyl acid phosphate, etc.

The reaction medium can occupy up to 60% or as little as 5% of the reactor volume. Generally, however, in batch operation the reaction medium occupies between 30 and 50% of the reactor volume.

Although melting point is an important physical property, in itself it is not sufficient to characterize the essentially hydrocarbon polymers as being of suitable quality for superior films and fibers. Melting point can be reduced by the presence of small amounts of low molecular weight material without affecting other properties, which render it highly useful for film and fiber uses, provided the inherent viscosity is sufficiently high. Thus, if the inherent viscosity of the polymer is at least 0.74, then the melting point can fall below 130° C. without sacrifice in the usefulness of the polymers for high quality films and fibers. The preferred essentially hydrocarbon polymers because of their outstanding usefulness for superior films and fibers are those having inherent viscosities of at least 1.0 and melting above 130° C.

The melting points specified in the examples represent the temperature at which complete disappearance of the crystalline structure is observed under a polarizing microscope.

The time of reaction depends upon such interdependent variables as temperature, pressure, and amount and type of catalyst employed. Under the preferred conditions for batch operation the reaction reaches completion in from 5 to 20 hours.

The catalysts used in the practice of this invention are those containing molybdenum in chemical combination with oxygen and a metal which itself or in the form of an oxide is capable of promoting hydrogenation reactions, in which catalysts the atomic ratio of oxygen to molybdenum is from 1.5:1 to 3:1.

One class of the above catalysts are the metal molybdites disclosed and claimed in the co-pending application of H. R. Arnold and J. E. Carnahan, U. S. Serial No. 111,982, filed August 23, 1949 now U. S. Patent No. 2,572,300, issued October 23, 1951. These molybdites exist in two series, in the first the molybdenum is present in the quadrivalent state corresponding to the oxide $MoO_2$ and the hypothetic acid $H_2MoO_3$, and in the second the molybdenum is present in the bivalent state corresponding to the oxide MoO and the hypothetic acid $H_2MoO_2$. Thus these molybdites are molybdites of a metal in which the metal Y is substituted for hydrogen in the acid formula $H_2MoO_n$ wherein $n$ is a whole number selected from the group consisting of 2 and 3, the ions of said metal Y forming by reaction with aqueous ammonia an oxide or hydroxide which is soluble in the presence of excess aqueous ammonia including oxides or hydroxides which are soluble in water. Examples of these molybdites are copper molybdite, $CuMoO_3$, nickel molybdite $NiMoO_2$, and cobalt molybdite, $CoMoO_2$ and $CoMoO_3$. These molybdites may contain promoters or modifiers, such as cadmium, barium, chromium, thorium, etc., if desired. Preferred molybdites because of their high degree of activity and selectivity are the molybdites of nickel, cobalt, and copper. These molybdites may be employed in the form of pellets, or as finely divided powders, and they may be used as such or extended on inert supports such as charcoal, alumina, silica, etc. The particular physical form of the catalyst for maximum activity depends upon the condition under which the hydrogenation reaction is to be conducted. Thus, for continuous operation it is best to have the catalyst in the form of pellets to minimize mechanical losses. If the process is to be operated as a batch operation, it is best that the catalyst be in finely divided form because in that way maximum catalyst activity is obtained. These molybdites may be blended with tungstites of the type disclosed and claimed in the co-pending application of H. R. Arnold and J. E. Carnahan, U. S. Serial No. 708,662, filed January 30, 1951. In order to aid in the dissipation of the heat of reaction and thus render it easier to control the reaction temperature, it is advantageous to mix the catalyst with copper, iron, aluminum, pellets, etc.

Molybdenum catalysts in which the molybdenum is in chemical combination with oxygen and a metal in a ratio other than that which corresponds to a molybdite are also useful in the practice of this invention, as illustrated in Example XV.

Still another form of catalyst is that obtained by treating a molybdenum compound with a salt of another metal, and reducing the product, as illustrated in Example XIV. In such catalysts the ratio of metal to molybdenum may be other than is required for a molybdite. The amount of catalyst used depends upon such interdependent variables as temperature, pressure, general method of operation, catalyst activity, etc. As a rule, in batch operation the amount of catalyst employed will be between 1.5% and 30% and preferably between 2.5% and 20% by weight of the reaction medium employed.

In continuous operation, the weight of product in the reactor at any time is ordinarily less than the weight of the catalyst, but the total weight of material processed during the active life of the catalyst is usually at least ten times the catalyst weight.

When the activity of the catalyst decreases or disappears through prolonged use, it may be restored by oxidizing the spent molybdite in air or oxygen at temperatures up to 500° C. and then reducing the resulting molybdate back to molybdite.

The surface of the reactor in contact with the reactants appears to be a factor in determining the molecular weight and yield of hydrocarbon polymer obtained. Silver or stainless steel are satisfactory materials.

The process of this invention, for the first time, makes it possible to convert carbon monoxide into products which are essentially all high molecular weight. These products, without purification, have molecular weights of at least 12,000, inherent viscosities greater than 0.74 and are convertible into fibers and films having strength and tenacity characteristics unobserved in any hitherto available synthetic hydrocarbon polymer films and fibers.

As many apparently widely different embodiments of this invention may be made without departing from the spirit and scope thereof, it is to be understood that this invention is not limited to the specific embodiments thereof except as defined in the appended claims.

We claim:

1. An essentially hydrocarbon polymer orientable by cold-drawing which is the reaction product of carbon monoxide and hydrogen, said hydrocarbon polymer melting above 130° C., having an inherent viscosity of at least 1.1, measured at 0.1% concentration in tetrahydronaphthalene at 125° C., and being capable of forming tough films having a density of at least 0.97, based on the annealed film and having a stiffness modulus greater than 150,000 lb./sq. in., and a microtensile breaking strength of at least 100,000 lb./sq. in., based on the relaxed, drawn dimension of a film of said polymer.

2. An essentially hydrocarbon polymer orientable by cold-drawing which is the reaction product of carbon monoxide and hydrogen, said hydrocarbon polymer melting above 130° C., having an inherent viscosity above 2.00, measured at 0.1% concentration in tetrahydronaphthalene at 125° C., and being capable of forming tough films which show orientation when cold drawn, having a density of at least 0.97, based on the annealed film and having a stiffness modulus greater than 150,000 lb./sq. in., and a microtensile breaking strenth of at least 100,000 lb./sq. in., based on the relaxed, drawn dimension of a film of said polymer.

3. An essentially hydrocarbon polymer orientable by cold-drawing which is the reaction product of carbon monoxide and hydrogen, said hydrocarbon polymer melting above 140° C., having an inherent viscosity above 2.00, measured at 0.1% concentration in tetrahydronaphthalene at 125° C., and being capable of forming tough films which show orientation when cold drawn, having a density of at least 0.97, based on the annealed film and having a stiffness modulus greater than 150,000 lb./sq. in., and a microtensile breaking strength of at least 100,000 lb./sq. in., based on the relaxed, drawn dimension of a film of said polymer.

4. A process for preparing essentially hydrocarbon polymers orientable by cold-drawing which comprises heating and reacting carbon monoxide with hydrogen at a temperature of 125° to 300° C. under a pressure of at least 200 atmospheres and in contact with a catalyst containing molybdenum in chemical combination with oxygen and a metal whose ions form by reaction with aqueous ammonia a compound selected from the class consisting of oxides and hydroxides which are soluble in the presence of excess aqueous ammonia and oxides and hydroxides which are soluble in water, the atomic ratio of oxygen to molybdenum in said catalyst being from 1.5:1 to 3:1, and separating therefrom a solid, essentially hydrocarbon polymer orientable by cold-drawing.

5. A process for preparing essentially hydrocarbon polymers orientable by cold-drawing which comprises continuously passing a liquid reaction medium and a mixture of carbon monoxide with hydrogen at a temperature of 125° to 300° C., under a pressure of at least 200 atmospheres through a catalytic zone and in contact therein with a catalyst containing molybdenum in chemical combination with oxygen and a metal whose ions form by reaction with aqueous ammonia a compound selected from the class consisting of oxides and hydroxides which are soluble in the presence of excess aqueous ammonia and oxides and hydroxides which are soluble in water, the atomic ratio of oxygen to molybdenum in said catalyst being from 1.5:1 to 3:1, and separating therefrom a solid, essentially hydrocarbon polymer orientable by cold-drawing.

6. A process for preparing essentially hydrocarbon polymers orientable by cold-drawing which comprises continuously passing a liquid reaction medium and a mixture of carbon monoxide with hydrogen at a temperature of 150° to 250° C., under a pressure in excess of 500 atmospheres downwardly through a catalytic zone and in contact therein with a catalyst containing molybdenum in chemical combination with oxygen and a metal whose ions form by reaction with aqueous ammonia a compound selected from the class consisting of oxides and hydroxides which are soluble in the presence of excess aqueous ammonia and oxides and hydroxides which are soluble in water, the atomic ratio of oxygen to molybdenum in said catalyst being from 1.5:1 to 3:1, and separating therefrom a solid, essentially hydrocarbon polymer orientable by cold-drawing.

7. A process for preparing essentially hydrocarbon polymers orientable by cold-drawing which comprises heating and reacting carbon monoxide with hydrogen at a temperature of 125° to 300° C. under a pressure of at least 200 atmospheres and in contact with a molybdite of a metal whose ions form by reaction with aqueous ammonia a compound selected from the class consisting of oxides and hydroxides which are soluble in the presence of excess aqueous ammonia and oxides and hydroxides which are soluble in water, said metal molybdite being a metal salt of an acid selected from the class consisting of the acid having the formula $H_2MoO_3$ and the acid having the formula $H_2MoO_2$, and separating therefrom a solid, essentially hydrocarbon polymer orientable by cold-drawing.

8. A process for preparing essentially hydrocarbon polymers orientable by cold-drawing which comprises heating and reacting carbon monoxide with hydrogen in a liquid reaction medium at a temperature of 150° to 250° C. under a pressure in excess of 500 atmospheres, and in contact with a molybdite of a metal whose ions form by reaction with aqueous ammonia a compound selected from the class consisting of oxides and hydroxides which are soluble in the presence of excess aqueous ammonia and oxides and hydroxides which are soluble in water, said metal molybdite being a metal salt of an acid selected from the class consisting of the acid having the formula $H_2MoO_3$ and the acid having the formula $H_2MoO_2$, and separating therefrom a solid, essentially hydrocarbon polymer orientable by cold-drawing.

9. A process for preparing essentially hydrocarbon polymers orientable by cold-drawing which comprises heating and reacting carbon monoxide with hydrogen at a temperature of 125° to 300° C. under a pressure of at least 200 atmospheres and in contact with a nickel molybdite catalyst having the formula $NiMoO_2$, and separating therefrom a solid, essentially hydrocarbon polymer orientable by cold-drawing.

10. A process for preparing essentially hydrocarbon polymers orientable by cold-drawing which comprises heating and reacting carbon monoxide with hydrogen in a liquid reaction medium at a temperature of 150° to 250° C. under a pressure in excess of 500 atmospheres, and in contact with a nickel molybdite catalyst having the formula $NiMoO_2$, and separating therefrom a solid, essentially hydrocarbon polymer orientable by cold-drawing.

11. A process for preparing essentially hydrocarbon polymers orientable by cold-drawing which comprises heating and reacting carbon monoxide with hydrogen at a temperature of 125° to 300° C. under a pressure of at least 200 atmospheres and in contact with a cobalt molybdite catalyst having the formula $CoMoO_3$, and separating therefrom a solid, essentially hydrocarbon polymer orientable by cold-drawing.

12. A process for preparing essentially hydrocarbon polymers orientable by cold-drawing which comprises heating and reacting carbon monoxide with hydrogen in a liquid reaction medium at a temperature of 150° to 250° C. under a pressure in excess of 500 atmospheres, and in contact with a cobalt molybdite catalyst having the formula $CoMoO_3$, and separating therefrom a solid, essentially hydrocarbon polymer orientable by cold-drawing.

MARK W. FARLOW.
ELBERT C. HERRICK.

References Cited in the file of this patent

UNITED STATES PATENTS

| Number | Name | Date |
|---|---|---|
| 2,351,345 | Kleine | June 13, 1944 |
| 2,352,328 | Kleine | June 27, 1944 |
| 2,495,286 | Brubaker | Jan. 24, 1950 |
| 2,495,292 | Scott | Jan. 24, 1950 |
| 2,507,510 | Frankenburg | May 16, 1950 |
| 2,509,204 | Bilisoly | May 30, 1950 |
| 2,572,300 | Arnold et al. | Oct. 23, 1951 |

OTHER REFERENCES

British Plastics, March 1945, pp. 94–98.
J. Applied Chem., I, Aug. 1951, pp. 370–376.